March 16, 1926.
H. ALLEN
PULLEY
Filed April 15, 1925
1,576,891
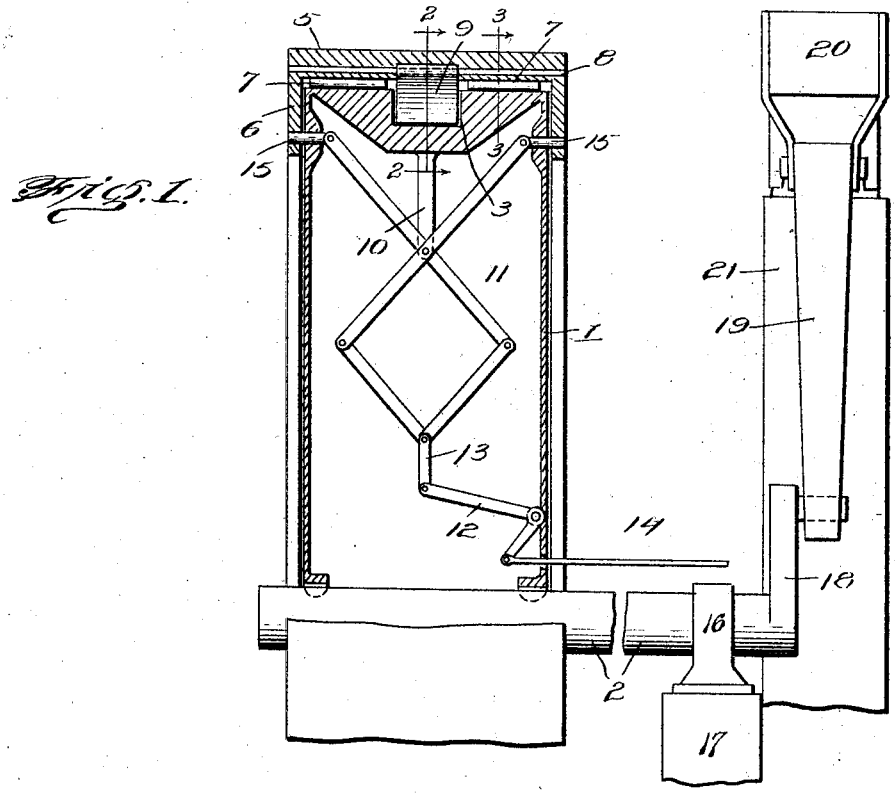
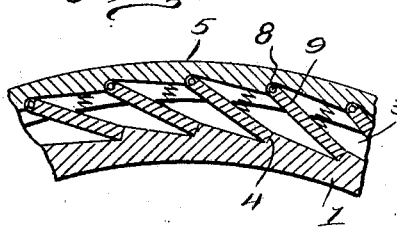
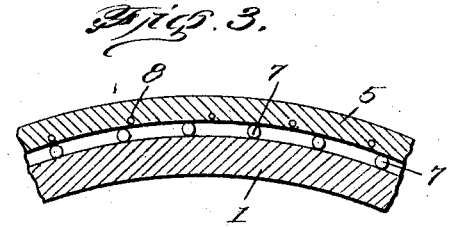
Inventor
Homer Allen.
By
Attorney Patented Mar. 16, 1926.

1,576,891

UNITED STATES PATENT OFFICE.

HOMER ALLEN, OF SLICK, OKLAHOMA.

PULLEY.

Application filed April 15, 1925. Serial No. 23,322.

*To all whom it may concern:*

Be it known that I, HOMER ALLEN, a citizen of the United States, residing at Slick, in the county of Creek and State of Oklahoma, have invented certain new and useful Improvements in a Pulley, of which the following is a specification.

This invention relates to an improved pulley designed with a view toward relieving an engine of constant strain.

While it is not necessary, the improved pulley is especially designed for use upon a crank shaft such as is used in association with an oil well drilling rig.

It follows that it is therefore my principal object to take advantage of the heavy weight of the drilling tool to act upon the improved pulley in a manner to intermittently relieve the engine of a strain to which it is otherwise subjected with the commonly constructed pulleys now used.

The details forming the improved pulley and the advantages derived from their use will become apparent from the following description and drawing.

In the accompanying drawing forming a part of this application, and in which like numerals are employed to designate like parts throughout the same:

Figure 1 is a fragmentary elevational and sectional view showing a pulley constructed in accordance with this invention keyed upon a crank shaft having operative connection with a pitman such as is employed in connection with an oil well drilling rig.

Figure 2 is a detail section taken approximately upon the plane of the line 2—2 of Figure 1.

Figure 3 is a similar section taken approximately on the line 3—3 of Figure 1.

The improved pulley comprises a hollow drum 1 which is keyed, or otherwise fixedly mounted upon the shaft 2. This drum is of hollow formation, and the peripheral band thereof is provided with a central annular channel or groove 3, the bottom of which is constructed to provide ratchet teeth 4 extending about the entire circumference.

Surrounding the periphery of the drum is a relatively movable rim 5 of a width slightly greater than the drum, this rim being provided with side flanges 6 holding it in place. It will be observed that the inner peripheral portion of the rim is spaced from the corresponding portion of the drum and roller bearings 7 are interposed therebetween to reduce friction. At circumferentially spaced points, pins 8 extend transversely through the rim, and mounted upon the central portions of these pins are spring pressed pawls 9, which are cooperable with the aforesaid ratchet teeth 4, any appropriate number of pawls being provided.

Carried by the drum is an inwardly extending bracket 10, upon which a toggle member 11 is mounted. This toggle member is confined within the drum, and is operated by the bell crank 12 and connecting link 13. The bell crank is rocked upon its pivot by an operating rod 14. Locking pins 15 are carried by the long arms of the toggle member and are adapted to be projected through aligned openings in the drum and flanges of the rim to positively lock the rim to the drum to prevent relative movement of the two parts.

It will be observed from Figure 1 also that the shaft 2 is journaled for rotation in a suitable bearing 16 on the supporting member 17, this shaft being provided on its outer end with a crank arm 18. The crank arm is connected to the lower end of a pitman 19, and this pitman is in turn connected to a walking beam 20 pivoted upon the standard 21 of a conventional well drilling rig. It is obvious that the well drilling tools (not shown) are connected to the opposite end of the walking beam, and it is well known that these tools are exceedingly heavy in weight. By providing the operating shaft for the rig with a pulley constructed in accordance with this invention, the engine (not shown) will be as before stated, relieved of considerable strain. To explain, it will be observed that during approximately one-half revolution of the shaft 2, the walking beam 20 will be rocked downwardly by the pitman and crank, thus raising the opposite end of the beam, and lifting the drilling tool. After the tools have been raised, and when they drop, it will be seen that the inherent weight of the same will exert a pull upon the shaft 2 through the medium of the rig. Referring to Figure 2 and assuming that the rim 5, and drum 1 are rotating in a direction from left to right under the action of the engine belt which is trained over the pulley, it will be seen that this excessive weight will be compensated for by the relative rotation of the drum 1 and shaft with respect to the rim 5. In other words, at this time the drum 1 will rotate much faster than the rim, and in this way the engine will be relieved of stress, and exertion which it would otherwise be subjected to. Of course, to permit this relative movement of the rim and drum of the pulley, the rod 14 would have to be actuated to retract the latch pins 15. Should it be desired to lock the rim to the drum, the latch pins would assume the position shown in Figure 1. At this time the pulley would function as any ordinary one-piece rigid pulley.

It is thought that by carefully considering the description in connection with the accompanying drawings, persons familiar with machine elements of this class will be able to obtain a clear understanding of the invention. For this reason a more lengthy description is deemed unnecessary.

While I have shown and described the improved pulley as being used on a crank shaft such as is employed in association with a well drilling rig, I wish it to be understood that the pulley is adaptable for use in other fields of work, but is particularly useful for the purpose specified. Also, other changes coming within the field of invention claimed may be resorted to if desired.

Having thus described the invention, what I claim as new and desire to secure by Letters Patent is:—

A pulley of the class described including a drum of hollow construction and having its peripheral band provided with a central annular channel, the bottom of which is provided with ratchet teeth extending about the entire circumference, a rim movable about the periphery of the drum and of a width slightly greater than the peripheral band of said drum, the inner surface of the rim being spaced from the outer surface of the band, roller bearings interposed between said surfaces, a plurality of spring pressed pawls mounted interiorly of the rim for co-operation with the ratchet teeth, and inwardly extending side flanges provided on the edges of the rim for holding said rim in place on said drum.

In testimony whereof I affix my signature.

HOMER ALLEN.